US008141080B2

(12) United States Patent
Bar-Or et al.

(10) Patent No.: US 8,141,080 B2
(45) Date of Patent: Mar. 20, 2012

(54) ASYNCHRONOUS DATA STRUCTURE PULL APPLICATION PROGRAMMING INTERFACE (API) FOR STREAM SYSTEMS

(75) Inventors: Amir Bar-Or, Newton, MA (US); Michael James Beckerle, Needham, MA (US)

(73) Assignee: International Business Machines Corporation, Armonk, NY (US)

( * ) Notice: Subject to any disclaimer, the term of this patent is extended or adjusted under 35 U.S.C. 154(b) by 1204 days.

(21) Appl. No.: 11/848,098

(22) Filed: Aug. 30, 2007

(65) Prior Publication Data

US 2009/0064157 A1 Mar. 5, 2009

(51) Int. Cl.
G06F 9/46 (2006.01)

(52) U.S. Cl. ........ 718/102; 718/100; 718/101; 718/103; 718/104

(58) Field of Classification Search .......................... None
See application file for complete search history.

(56) References Cited

U.S. PATENT DOCUMENTS

| 4,442,484 | A | * | 4/1984 | Childs et al. .................. 711/163 |
| 5,873,081 | A | * | 2/1999 | Harel .................................... 1/1 |
| 6,005,866 | A | * | 12/1999 | Lincoln ......................... 370/398 |
| 6,505,190 | B1 | * | 1/2003 | Harel et al. .................... 707/754 |
| 6,810,012 | B1 | | 10/2004 | Yin et al. |
| 7,046,688 | B2 | | 5/2006 | Amou et al. |
| 7,181,573 | B2 | | 2/2007 | Wolrich et al. |
| 2002/0069319 | A1 | | 6/2002 | Lee et al. |
| 2003/0037117 | A1 | | 2/2003 | Tabuchi |
| 2003/0056047 | A1 | * | 3/2003 | Connor et al. ................. 710/260 |
| 2003/0115347 | A1 | | 6/2003 | Wolrich et al. |
| 2003/0202517 | A1 | | 10/2003 | Kobayakawa et al. |
| 2005/0047415 | A1 | * | 3/2005 | Channegowda et al. ... 370/395.4 |
| 2005/0243853 | A1 | | 11/2005 | Bitar et al. |
| 2005/0249220 | A1 | | 11/2005 | Olsen et al. |
| 2006/0064697 | A1 | * | 3/2006 | Kagi et al. ..................... 718/103 |
| 2006/0104295 | A1 | | 5/2006 | Worley et al. |
| 2009/0249312 | A1 | * | 10/2009 | Liao et al. ..................... 717/140 |

OTHER PUBLICATIONS

De Nivelle, H., "Verification of a Result Checker for Priority Queues", Apr. 6, 2006, 29 pp.

* cited by examiner

*Primary Examiner* — Emerson Puente
*Assistant Examiner* — Jonathan R Labud
(74) *Attorney, Agent, or Firm* — Janaki K. Davda; Konrad Raynes & Victor LLP

(57) ABSTRACT

Provided are techniques for processing data items. A limit on the number of dequeue operations allowed in a current step of processing for a queue-like data structure is set, wherein the number of allowed dequeue operations limit at least one of an amount of CPU resources and an amount of memory resources to be used by an operator. The operator to perform processing is selected and the operator is activated by passing control to the operator, which then dequeues data constrained by the limits set. In response to receiving control back from the operator, the data structure size is examined to determine whether the operator made forward progress in that the operator enqueued or dequeued at least one data item.

24 Claims, 10 Drawing Sheets

Computing Device 200

Scheduler 210

Data Flow Diagram 220

Operators 222

Arcs 224

Pretender Data Structure(s) 230

FIG. 2

ASYNCHRONOUS DATA STRUCTURE PULL APPLICATION PROGRAMMING INTERFACE (API) FOR STREAM SYSTEMS

BACKGROUND

1. Field

Embodiments of the invention relate to an asynchronous data structure pull Application Programming Interface (API) for stream systems.

2. Description of the Related Art

A process may be described as a data flow diagram. A process may be constructed from the following components: a data flow diagram, operators, and arcs. A data flow diagram may be described as a directed graph where the vertices/boxes of the graph are called operators and the arcs describe directional flow of data. The data flow diagram describes the data as the data flows from various data sources through the different operators to various data targets. Operators are able to read data from an external resource, write data to an external resource, and/or apply data transformations while doing so. In general, operators are able to consume data from every incoming arc and can produce data on every outgoing arc. Many operators are provided as built-in operators to provide common data access and transformations, while other operators may be created by the user and easily integrated into the system. Arcs represent flow of data between two connected operators.

A continuous process may be described as a process that reads from continuous data sources (i.e., data sources that provide data continually) and generates result data corresponding to input data as the input data becomes available. A system that runs as a continuous process is a "stream system". A stream system may be represented by a data flow diagram.

A scheduler may be described as a runtime component that activates the operators of the process. The scheduler's job is to allow the process to produce data while minimizing consumed resources, such as memory and CPU, and while maximizing Quality of Service (QoS) measurements, such as latency and throughput.

FIG. 1 illustrates a fragment of a Process 100 with four operators, Operator A, Operator B, Operator C, and Operator D. In FIG. 1, Operators A and B consume data from their incoming queues and produce data into the queues that are consumed by operator C. Operator C is consuming and processing that data in its incoming queues and is producing more data that is sent via another queue to operator D.

While the data is streaming into and out of the operators, the scheduler needs to decide in every step which operator (or operators) to activate. In particular, the execution time of a process is composed from a finite number of scheduler steps. In the beginning of each step, the scheduler decides which operators will be activated during that step.

In event-based methods, a routine or method is invoked for each data item received or possibly for each available output location made available. However, some such event-based methods do not provide a desired coarse granularity. A drawback of the event-based approach is overhead due to lack of granularity control. A method invocation is required for each data item delivered to the operator, and the operator code restores and then saves back any state needed between the receipt of every data item received.

With multi-threading, use of multiple threads incurs the overhead of stack allocation and switching, which is more costly than ordinary procedure calling. Moreover, multi-threading is disallowed in some execution frameworks (e.g., Java® 2 Platform, Enterprise Edition (J2EE™) application servers (Java and J2EE are trademarks of Sun Microsystems, Inc. in the United States, other countries, or both)).

In general, use of threads may be considered problematic because such use destroys most composition properties of programs. For example, in order to use a library of software, the developer needs to know whether or not the library uses threads and how the threads are used in order to know whether the library can be used from another context that uses threads.

Finally, some third party code that needs to be included in operators may simply not be thread safe. Hosting this code requires either an entirely separate operating-system-level process or requires a single-threaded operator framework implementation.

One of the desirable properties of a dataflow system (i.e., a system that processes data flow diagrams) is the ability to avoid use of thread-based concurrency. For example, J2EE™ application server-based deployments disallow use of threads by applications. Hence, it is the nature of single-threaded systems that once the scheduler activates an operator and passes control to the operator, it is up to the operator to decide when to return control to the scheduler. That is, the scheduler cannot interrupt the operator, or cancel activation of the operator, or even initiate communication with the operator until the operator decides to end the current activation cycle. Furthermore, the scheduler has no knowledge of the nature of the logic implemented by the operators. Thus, a kind of cooperative multitasking is needed.

SUMMARY OF EMBODIMENTS OF THE INVENTION

Provided are a method, computer program product, and system for processing data items. A number of allowed dequeue operations allowed in a current step of processing for a data structure is set, wherein the number of allowed dequeue operations limit at least one of an amount of CPU resources and an amount of memory resources to be used by an operator. The operator to perform processing is selected. The operator is activated by passing control to the operator, wherein the operator is capable of consuming data from one or more input arcs and producing data on one or more output arcs. In response to receiving control back from the operator, the data structure size is examined to determine whether the operator enqueued or dequeued at least one data item.

BRIEF DESCRIPTION OF THE DRAWINGS

Referring now to the drawings in which like reference numbers represent corresponding parts throughout:

FIG. 2 illustrates details of a computing device in accordance with certain embodiments.

DETAILED DESCRIPTION

Figure 1:
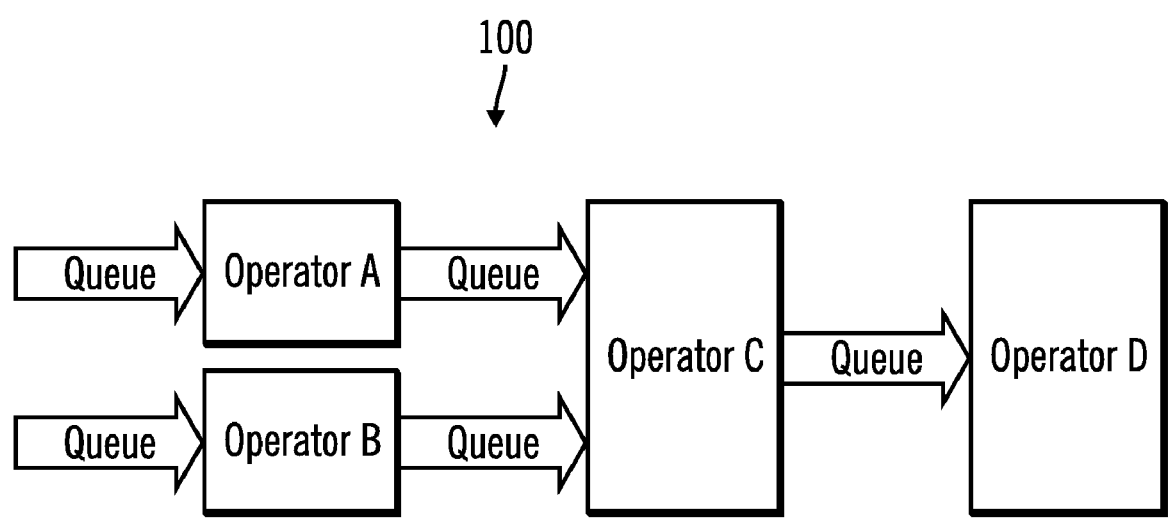
FIG. 1 illustrates a fragment of a Process with four operators, Operator A, Operator B, Operator C, and Operator D.

In the following description, reference is made to the accompanying drawings which form a part hereof and which illustrate several embodiments of the invention. It is understood that other embodiments may be utilized and structural and operational changes may be made without departing from the scope of the invention.

Given a single threaded scheduler, embodiments provide an operator API to be used by the scheduler that supports the following:

On operators: activate( )
On arc getQueue( ) returns queue
On queues enqueue(data) returns status
dequeue( ) returns data or null
isEmpty( ) returns true/false
size( ) returns integer 0 or greater
wasLast( ) returns true/false 1. The scheduler activates the operator by allowing the operator to consume data
2. The scheduler activates the operator by allowing the operator to produce data
3. In a single activation, an operator can consume data from each input arc and produce data arbitrarily on each output arc.
4. One activation uses limited CPU resources defined by the scheduler. That is, the operator's activation duration is determined by scheduler and not by the operator.
5. An operator does not wait for data that has not arrived. That is, the operator code does not block the activating thread either for data to arrive or for output acknowledgments, nor can the operator poll the inputs repeatedly until data arrives.
6. The scheduler is able to enforce forward progress. That is, the scheduler enforces that data was consumed or data was produced or both by the operator during an activation.
7. An activation uses limited memory resources defined by the scheduler for incoming and outgoing data.
8. Granularity of activations may be larger than one data item: In any single activation an operator may produce and consume multiple items within scheduler-defined resource limitations.
9. The scheduler may multiplex multiple operators sequentially on a single thread of control using a single stack. In certain embodiments, operators do not have their own threads or stack space. In certain other embodiments, operators may have their own threads or stack space (i.e., such embodiments use multiple threads/stacks).

FIG. 2 illustrates details of a computing device 100 in accordance with certain embodiments. The computing device 100 includes a scheduler 210, at least one data flow diagram 220, and one or more pretender data structures 230. The pretender data structure 220 includes logic as well as a data structure for storing data items. The data flow diagram 220 includes operators 222 and arcs 224.

Figure 3:
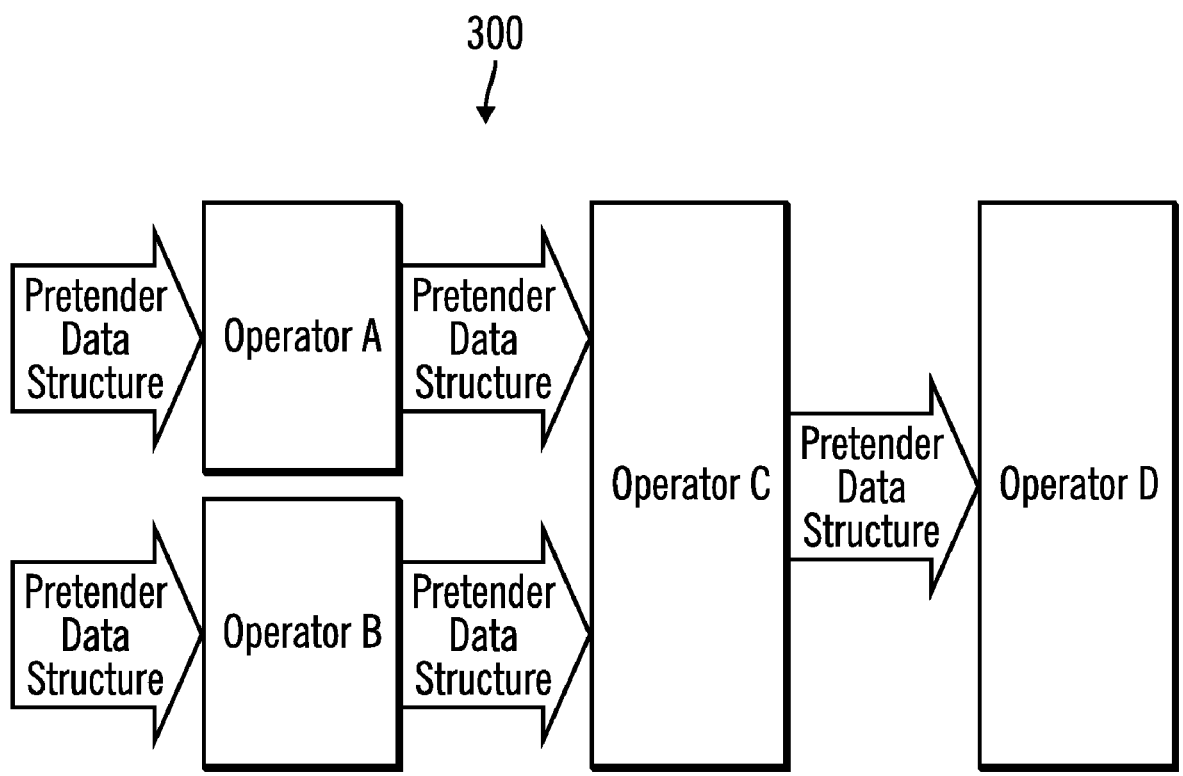
FIG. 3 illustrates a fragment of a Process in accordance with certain embodiments.

FIG. 3 illustrates a fragment of a Process 300 in accordance with certain embodiments. Within embodiments, pretender data structures 230 collaborate with the scheduler 210. The pretender data structures 230 replace conventional queues (FIG. 1) between the operators 220, and the operators 222 operate on the pretender data structures 230 as if the pretender data structures 230 were conventional queues, that is, using enqueue( ) and dequeue( ) operations.

The pretender data structures 230 do not behave as conventional queues. For example, if the scheduling requirements are such that an active operator 222 that consumes a pretender data structure 230 needs to be deactivated, the pretender data structure 230 pretends to be empty. This means an operator 222 cannot keep running on more data independently of the scheduler 210 (i.e., the operator 222 cannot continue processing without returning control to the scheduler 210, which may then activate that operator 222 again later in a subsequent step.). In conventional solutions, the operator 222 could spin forever in an infinite loop (e.g., either because of a flaw in the operator logic that is not detected, or because of a lack of the level of cooperation required from the operator 222). However, within embodiments, the operator 222 is not able to get more data to continue work on unless the operator 222 cooperates with the framework by returning control to the scheduler 210 after the operator 222 has been activated and done some processing. By way of the pretender data structure's behavior, the scheduler 210 is able to enforce the required level of cooperation on the operator.

Table 1 provides the definitions of terms used in the flow charts described in FIGS. 4A, 4B, 5A, 5B, and 6 where the scheduler 210 may be said to perform processing in steps:

TABLE 1

| Variable Name | |
|---|---|
| Data Structure | A data structure (e.g., a conventional queue) for storing data items. An operator 222 consumes and produces data items. |
| CurrentStep | A current step of the scheduler 210 |
| LastDeqStep | The scheduler step in which the operator 222 has a last successful Dequeue operation (i.e., to remove a data item from the data structure) |
| AllowedDequeues | Number of Dequeue operations allowed in each step |
| CurrentDequeues | Number of successful Dequeue operations done in the current step |
| numFailedAttempts | Number of unsuccessful Dequeue operations done in the current step |

Figure 4A:
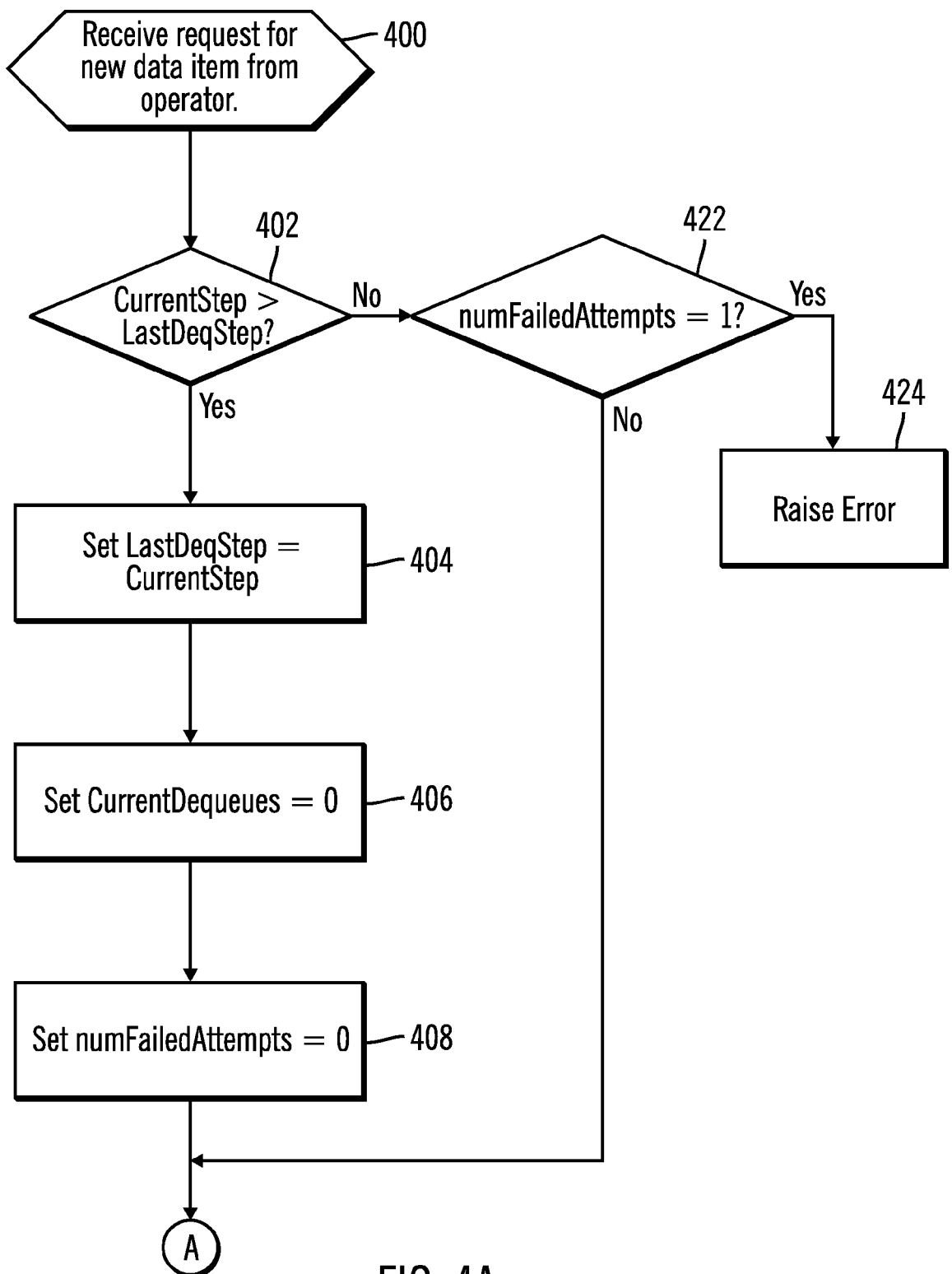
FIGS. 4A and 4B illustrate logic performed by a pretender data structure in response to receiving a request for a new data item from an operator in accordance with certain embodiments.
Figure 4B:
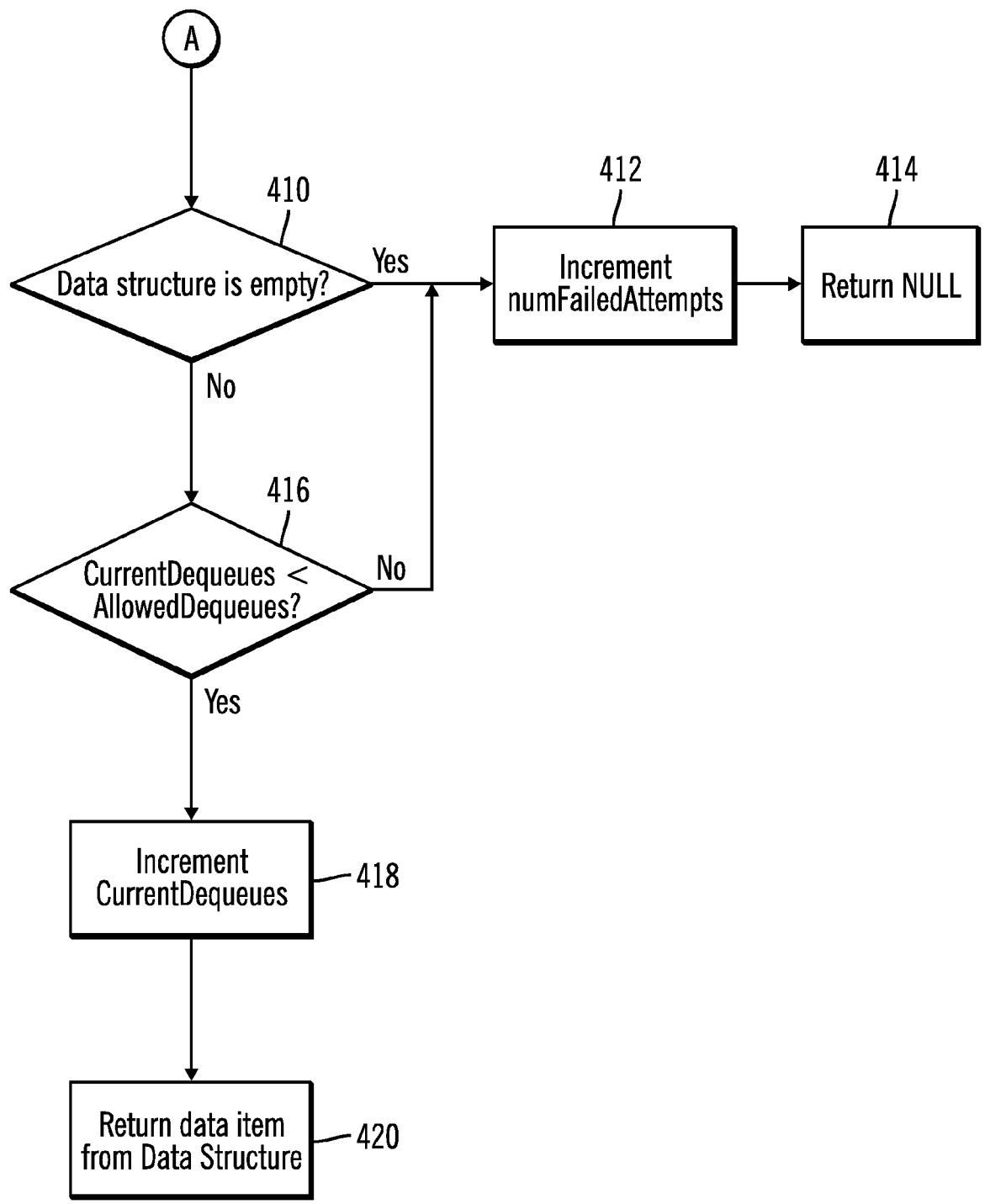

FIGS. 4A and 4B illustrate logic performed by a pretender data structure 230 in response to receiving a request for a new data item from an active operator 222 in accordance with certain embodiments. Control begins at block 400 (FIG. 4A) with the pretender data structure 230 receiving a request for the new data item from the operator 222 (e.g., a Dequeue operation). In block 402, the pretender data structure 230 determines whether a current step of the scheduler 210 is greater than a scheduler step in which the operator 222 had a last successful Dequeue operation (i.e., CurrentStep>LastDeqStep). If so, processing continues to block 404, otherwise, processing continues to block 422.

In block 404, the pretender data structure 230 sets the scheduler step in which the operator 222 had a last successful Dequeue operation to be the current step (i.e., LastDeqStep=CurrentStep). Processing continues to block 406, and the pretender data structure 230 sets the number of successful Dequeue operations done in the current step to zero (i.e., CurrentDequeues=0). Processing continues to block 408, and the pretender data structure 230 sets the number of unsuccessful Dequeue operations done in the current step to zero (i.e., numFailedAttempts=0). From block 408 (FIG. 4A), processing continues to block 410 (FIG. 4B).

In block 410, the pretender data structure 230 determines whether a data structure is empty. If so, processing continues to block 412, otherwise, processing continues to block 416.

In block 412, the pretender data structure 230 increments the number of unsuccessful Dequeue operations done in the current step by one (i.e., numFailedAttempts++). Processing continues to block 414, the pretender data structure 230 returns NULL in response to the operator request for the new data item (because the data structure is empty).

In block 416, the pretender data structure 230 determines whether the number of successful Dequeue operations done in the current step are less than the number of allowed Dequeue operations for the current step (i.e., CurrentDequeues<AllowedDequeues). If so, processing continues to block 418, otherwise, processing continues to block 412.

In block 418, the pretender data structure 230 increments the number of successful Dequeue operations done in the current step (i.e., CurrentDequeues++). Processing continues to block 420, and the pretender data structure 230 returns a data item (i.e., dequeues a data item from the data structure and returns that data item (return q.Dequeue( )).

Returning to FIG. 4A, in block 422, the pretender data structure 230 determines whether the number of unsuccessful Dequeue operations done in the current step is one. If so, processing continues to block 424, otherwise, processing continues to block 410 (FIG. 4B). In block 424, the pretender data structure 230 raises an error (e.g., by throwing an exception). That is, to ensure that the operator 222 does not wait for data that has not arrived (i.e., the operator code cannot block either for data to arrive or for output acknowledgments), if the operator tries to perform a Dequeue operation after an unsuccessful Dequeue operation in the same step without returning to the scheduler 210, an error is raised.

Figure 5A:
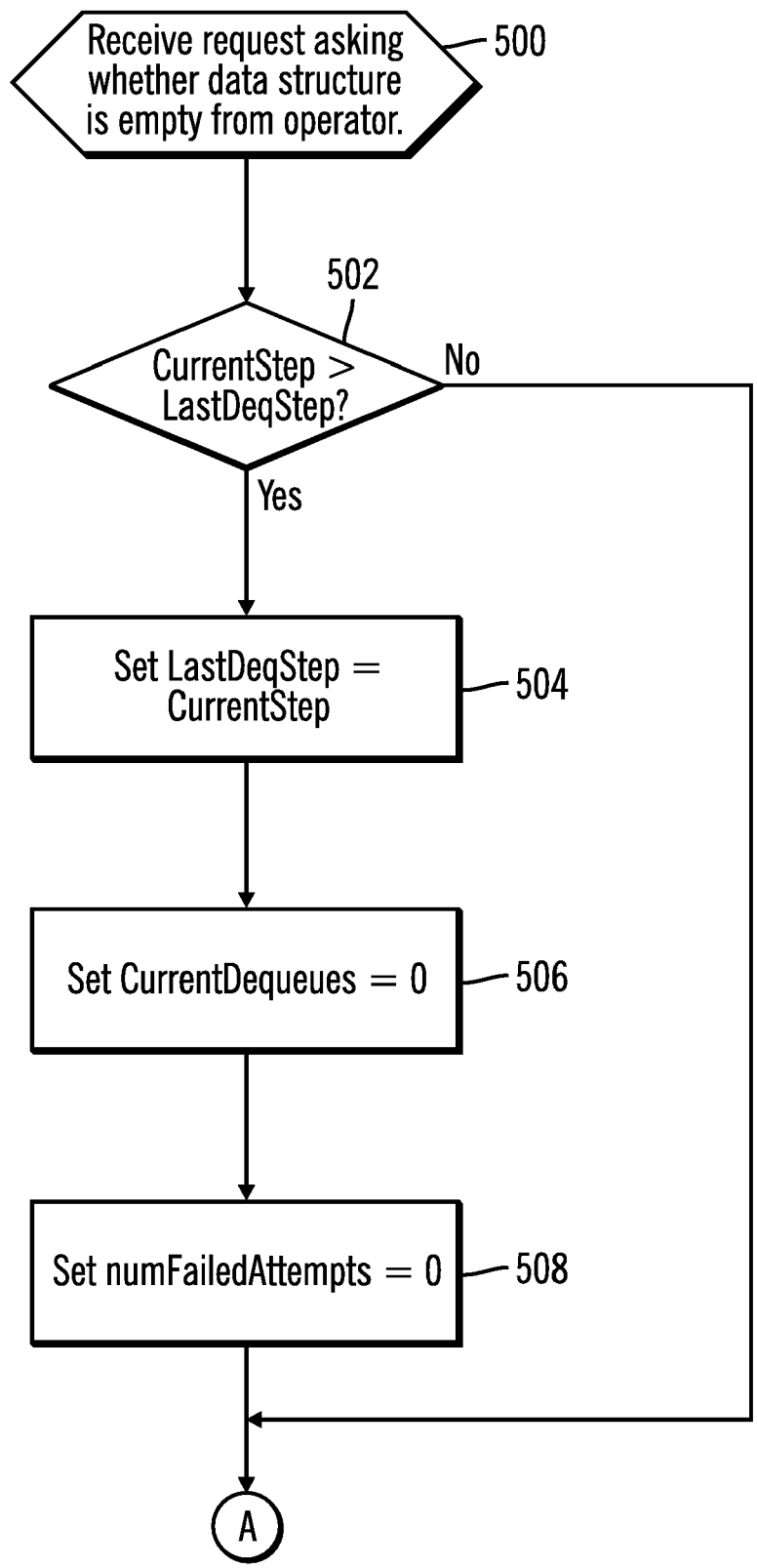
FIGS. 5A and 5B illustrate logic performed by a pretender data structure in response to receiving a request asking whether a queue is empty from an operator in accordance with certain embodiments.
Figure 5B:
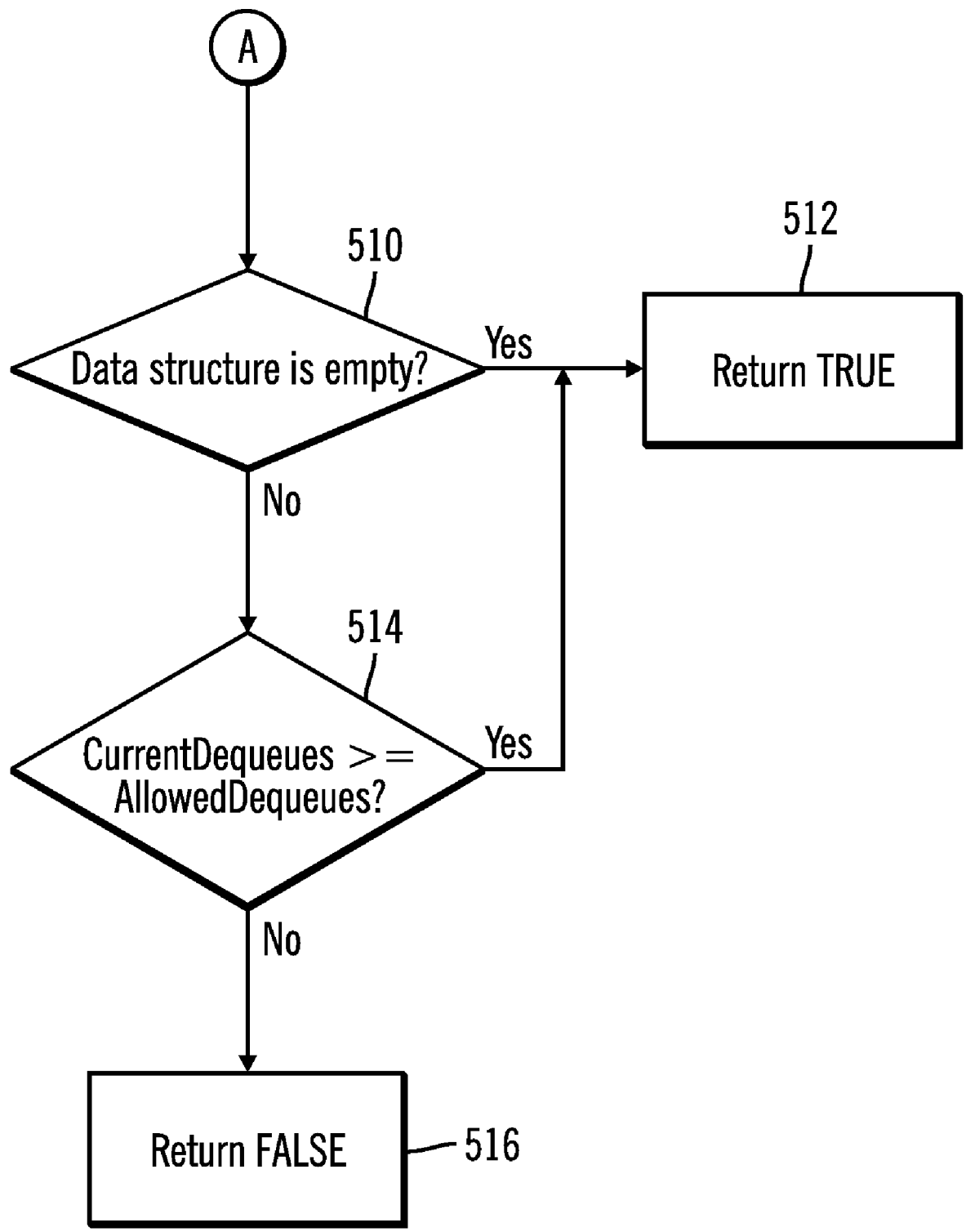

FIGS. 5A and 5B illustrate logic performed by a pretender data structure 230 in response to receiving a request asking whether a data structure is empty from an operator 222 in accordance with certain embodiments. Control begins at block 500 (FIG. 5A) with the pretender data structure 230 receiving a request asking whether the data structure is empty from an operator 222 (e.g., a Queue isEmpty operation). In block 502, the pretender data structure 230 determines whether a current step of the scheduler 210 is greater than a scheduler step in which the operator 222 had a last successful Dequeue operation (i.e., CurrentStep>LastDeqStep). If so, processing continues to block 504, otherwise, processing continues to block 510 (FIG. 5B).

In block 504, the pretender data structure 230 sets the scheduler step in which the operator 222 had a last successful Dequeue operation to be the current step (i.e., LastDeqStep=CurrentStep). Processing continues to block 506, and the pretender data structure 230 sets the number of successful Dequeue operations done in the current step to zero (i.e., CurrentDequeues=0). Processing continues to block 508, and the pretender data structure 230 sets the number of unsuccessful Dequeue operations done in the current step to zero (i.e., numFailedAttempts=0). From block 508 (FIG. 5A), processing continues to block 510 (FIG. 5B).

In block 510, the pretender data structure 230 determines whether a data structure is empty. If so, processing continues to block 512, otherwise, processing continues to block 514.

In block 512, the pretender data structure 230 returns TRUE to the operator 222 in response to the request asking whether the data structure is empty.

In block 514, the pretender data structure 230 determines whether the number of successful Dequeue operations done in the current step are greater than or equal to the number of allowed Dequeue operations for the current step (i.e., CurrentDequeues>=AllowedDequeues). If so, processing continues to block 512, otherwise, processing continues to block 516. In block 516, the pretender data structure 230 returns FALSE to the operator 222 in response to the request asking whether the data structure is empty. That is, if the number of actual Dequeue operations performed by the operator 222 in a step equal or exceed the number of allowed Dequeue operations for that operator 222 in the step, then the pretender data structure 230 returns an indication that the data structure is empty even when the data structure is not actually empty. Hence, the operator cannot obtain data and so must return control to the scheduler.

Figure 6:
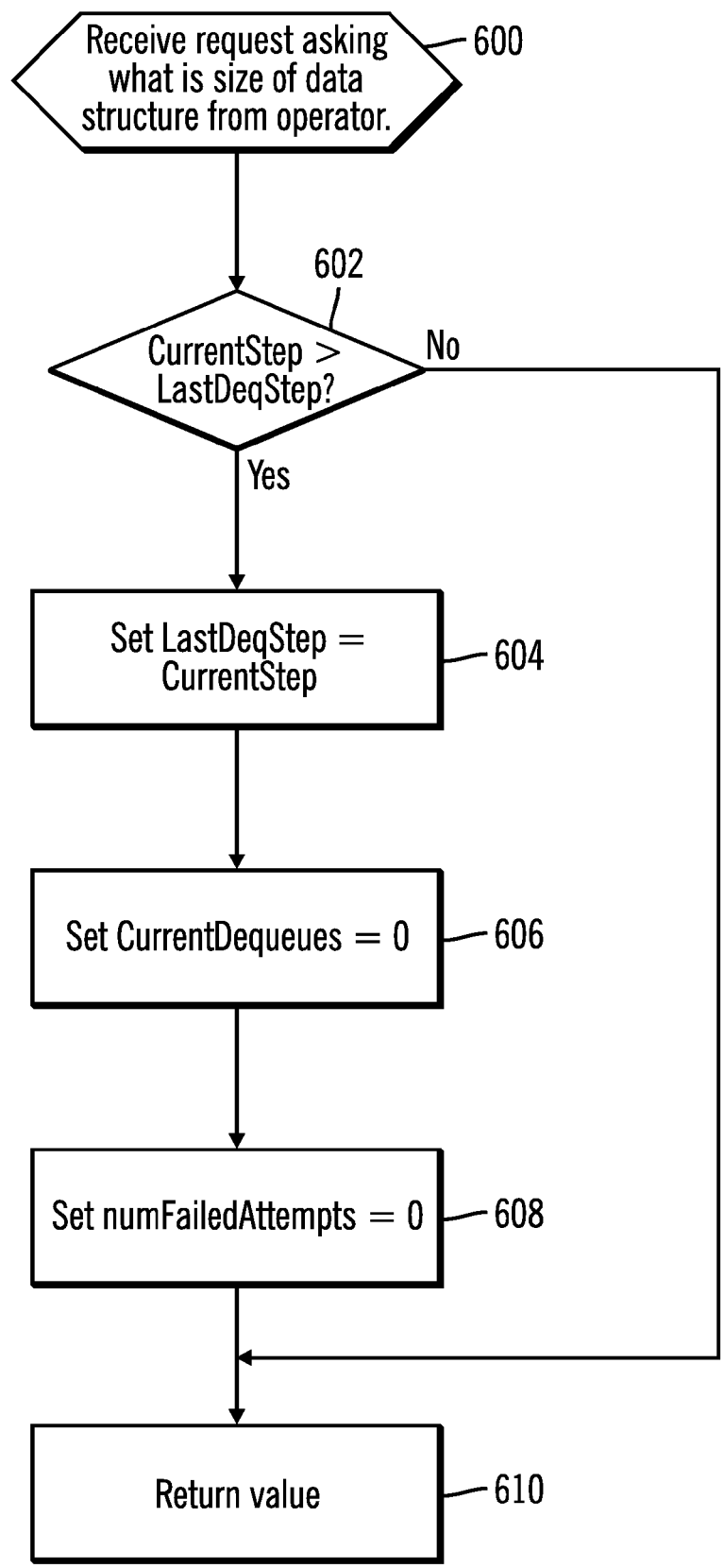
FIG. 6 illustrates logic performed by a pretender data structure in response to receiving a request asking the size of a queue from an operator in accordance with certain embodiments.

FIG. 6 illustrates logic performed by a pretender data structure 230 in response to receiving a request asking the size of a data structure from an operator 222 in accordance with certain embodiments. Control begins at block 600 with the pretender data structure 230 receiving a request asking the size of the data structure from the operator 222 (e.g., a Queue size operation). In block 602, the pretender data structure 230 determines whether a current step of the scheduler 210 is greater than a scheduler step in which the operator 222 had a last successful Dequeue operation (i.e., CurrentStep>LastDeqStep). If so, processing continues to block 604, otherwise, processing continues to block 610.

In block 604, the pretender data structure 230 sets the scheduler step in which the operator 222 had a last successful Dequeue operation to be the current step (i.e., LastDeqStep=CurrentStep). Processing continues to block 606, and the pretender data structure 230 sets the number of successful Dequeue operations done in the current step to zero (i.e., CurrentDequeues=0). Processing continues to block 608, and the pretender data structure 230 sets the number of unsuccessful Dequeue operations done in the current step to zero (i.e., numFailedAttempts=0). From block 608 (FIG. 6A), processing continues to block 610 (FIG. 6B).

In block 610, the pretender data structure returns a value in response to the request asking the size of the data structure to the operator 222. In particular, rather than providing the actual size of the data structure, the pretender data structure returns a value of the maximum of the number of allowed Dequeue operations minus the number of successful Dequeue operations done in the current step (i.e., Max(AllowedDequeues-CurrentDequeues, q.size( )).

Figure 7:
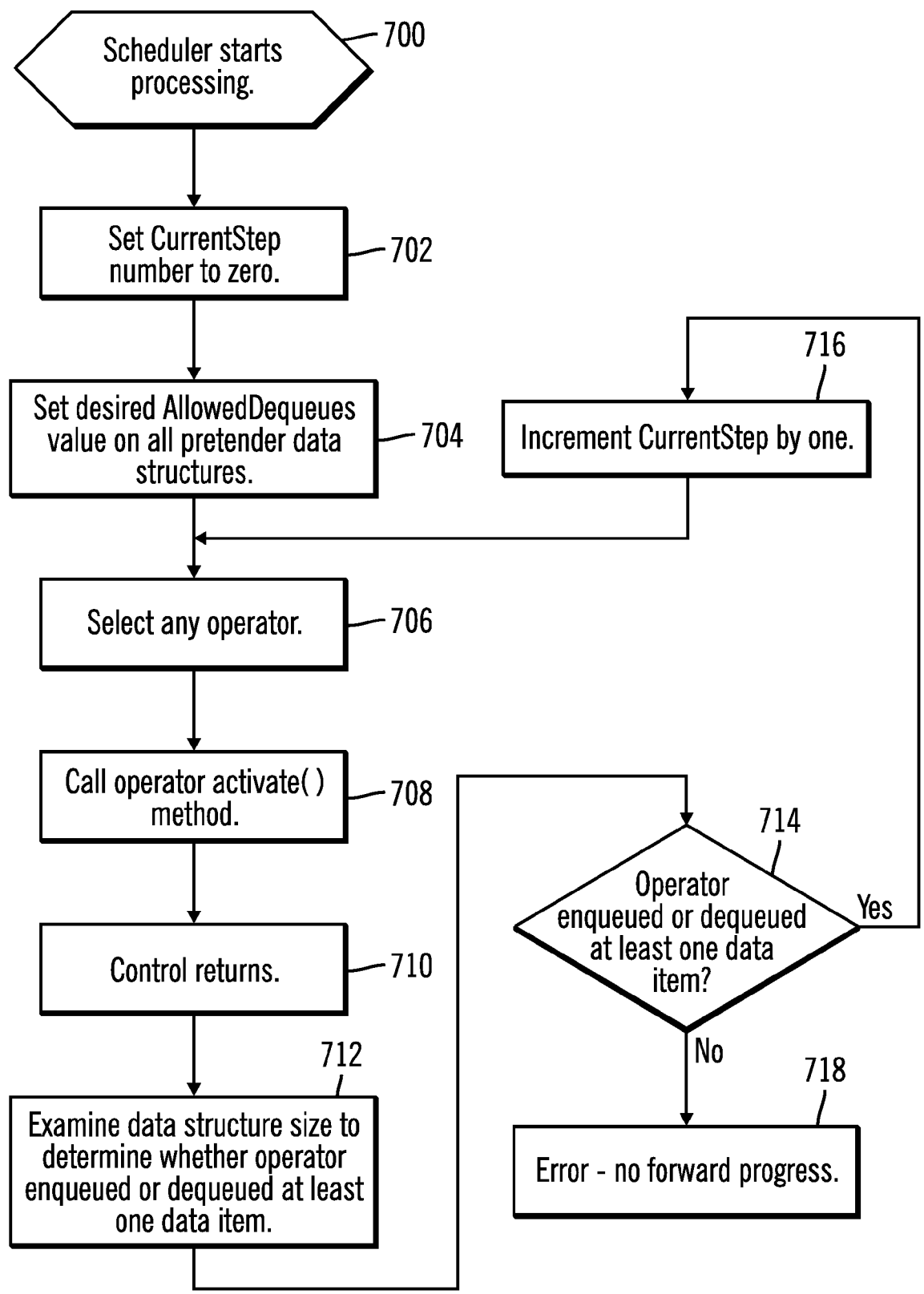
FIG. 7 illustrates processing performed by a scheduler in accordance with certain embodiments.

FIG. 7 illustrates processing performed by the scheduler 210 in accordance with certain embodiments. Control begins at block 700 with the scheduler 210 starting processing. In block 702, the CurrentStep number is set to zero. CurrentStep may be considered a step counter. In block 704, the scheduler 210 sets a desired AllowedDequeues value (i.e., number of allowed dequeue operations) on all pretender data structures 230. That is, when activation is to use limited CPU resources defined by the scheduler 210 (i.e., the operator 222 activation duration is determined by the scheduler 210 rather than by the operator 222) or activation is to use limited memory resources defined by the scheduler 210 (i.e., the operator 222 activation memory use is determined by the scheduler 210 rather than by the operator 222) for incoming and outgoing data, the scheduler 210 sets the AllowedDequeues value of the operator's 222 incoming data structures so that the operator is limited to consuming a number of data items based on the allowed number of Dequeue operations and to then returning control to the scheduler 210 before the operator 222 can consume more data items. Thus, the operator 222 has a limited operation time that is proportional to the AllowedDequeues value set by the scheduler 210. This will also use memory that is proportional to the AllowedDequeues value set by the scheduler 210.

In block 706, the scheduler 210 selects any operator 222. In certain embodiments, the scheduler 210 is able to multiplex multiple operators 222 on a single thread of control using a single stack, and there is no need for operators 222 to have their own threads or stack space (although embodiments which use multiple threads/stacks are not precluded). Since the operators 222 return control to the scheduler 210 after every step, in each step the scheduler 210 can select a particular operator 222 to activate (i.e., the particular operator 222 can be the same or different operator 222 than the operator 222 that returned control most recently). Thus, the scheduler 210 uses a single thread of control with a single stack for any number of operators 222.

Next, the operator 222 is activated, thereby allowing the operator 222 to consume or produce data. In particular, the scheduler 210 calls the operator activates method (block 708). To activate the operator 222 by allowing the operator 222 to produce data, the scheduler 210 calls the operator activate( ) method.

Block 710 is entered when the operator activate( ) call returns. In block 712, the scheduler 210 examines the data structure size to determine whether the operator 222 enqueued or dequeued at least one data item. That is, to enable the scheduler 210 to enforce forward progress (data was consumed, data was produced), the scheduler 210 is able to examine the data structure sizes and decide whether the operator has made progress or not. In block 714, the scheduler 210 ensures forward progress by checking on return from an operator activation whether the operator 222 did in fact dequeue or enqueue at least one data item. In certain embodiments, if there is no forward progress, an exception is thrown by the error block 718. If there is forward progress, then at block 716, CurrentStep is incremented (e.g., currentStep++), and processing loops back to block 706.

With reference to the operator, in any single activation, to enable an operator 222 to produce and consume multiple items while not exceeding resource limitations, the scheduler 210 sets the AllowedDequeues value to a number greater than one, and the operator 222 is able to consume multiple items and produce multiple items before returning control to the scheduler 210.

To ensure that the operator 222 does not wait for data that has not arrived (i.e., the operator code cannot block either for data to arrive or for output acknowledgments), if the operator tries to perform a Dequeue operation after an unsuccessful Dequeue operation in the same step without returning to the scheduler 210, an error is raised by the pretender data structure 230. This prevents the operator from implementing a poll-algorithm. A poll algorithm may be described as a looping and repeating of a method/question until the desired result is obtained. This results in poor performance behavior since the CPU cycles are wasted on the repeats. Also, the operator code cannot block, since the operator 222 has to return control to the scheduler 210 to enable the scheduler to change the current step count which allows the Dequeue operation to deliver data again during the next activate( ) call of this operator.

As to pretender data structures, embodiments overload a Dequeue operation (i.e., Dequeue ( )) result so that the scheduler 210 is able to control the granularity of action of the operator 222 for input data and overload an Enqueue operation (i.e., Enqueue ( )) result so that the scheduler 210 is able to suggest or control granularity of action of the operator 222 for output data. For example, the AllowedDequeues variable may be used for input granularity, while an AllowedEnqueues variable may be used for output granularity.

Within embodiments, a scheduler 210 decides what the granularity of action of the operators 222 are by controlling the pretender data structures.

The scheduler 210 prevents busy-waiting inside operators by controlling pretender queues so that their return status does not return to data-available once it has become data-unavailable during any single activation. For example, an operator 222 asks whether a data structure is empty more than once in a single activation step, it is determined that the operator 122 is attempting to implement polling and an exception is thrown.

Embodiments provide a separate technique for determining whether the end of data has been actually reached to distinguish this from the case in which the scheduler 210 has decided not to make data available or data is actually not available. In certain embodiments, if a Dequeue operation returns null, it is determined that either the operator 222 cannot consume any more data or data has ended. To distinguish between the two, an API method of the pretender data structure (the wasLast( ) method) returns true if this is the real final end of data, and not just a temporary end for purposes of control by the scheduler 210 or temporary unavailability of data.

As to output direction, for finite size vectors, embodiments provide a method to close the queue and end the data stream.

Embodiments combine with co-routines to allow use of a blocking-style API where a co-routine with a separate stack (i.e., not the scheduler thread's stack) is used when running the operator logic.

Embodiments use large values for AllowedDequeues to enable the activated operator to enter a loop and handle data for a substantial period of time, keeping intermediate data in local state, thereby reducing the scheduling overhead to a small percentage of overall data processing overhead. This allows amortizing the cost of scheduling by allowing the operator to have an autonomic run over a quota determined by the scheduler. This results in a higher performance of the overall system.

Embodiments enable hosting third party library code in a single-threaded environment, thereby avoiding the overhead of separate operating system level processes.

Embodiments allow operators to use regular function calls when processing the data, rather than the event driven procedures that are used in some of the conventional approaches. This means operators can specify the way their logic traverses the data rather than having to traverse the data however it arrives which is characteristic of the event-driven style.

For any data flow system (e.g., an IBM® WebSphere® DataStage® system, an IBM® WebSphere® Message Broker system, or an IBM® DB2® Query processor) that desires the ability to schedule operators adaptively to achieve high performance, embodiments simplify the construction of those systems.

ADDITIONAL EMBODIMENT DETAILS

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 4A, 4B, 5A, 5B, 6, and 7 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 4A, 4B, 5A, 5B, 6, and 7 may be implemented in software, hardware, programmable and non-programmable gate array logic or in some combination of hardware, software, or gate array logic.

Figure 8:
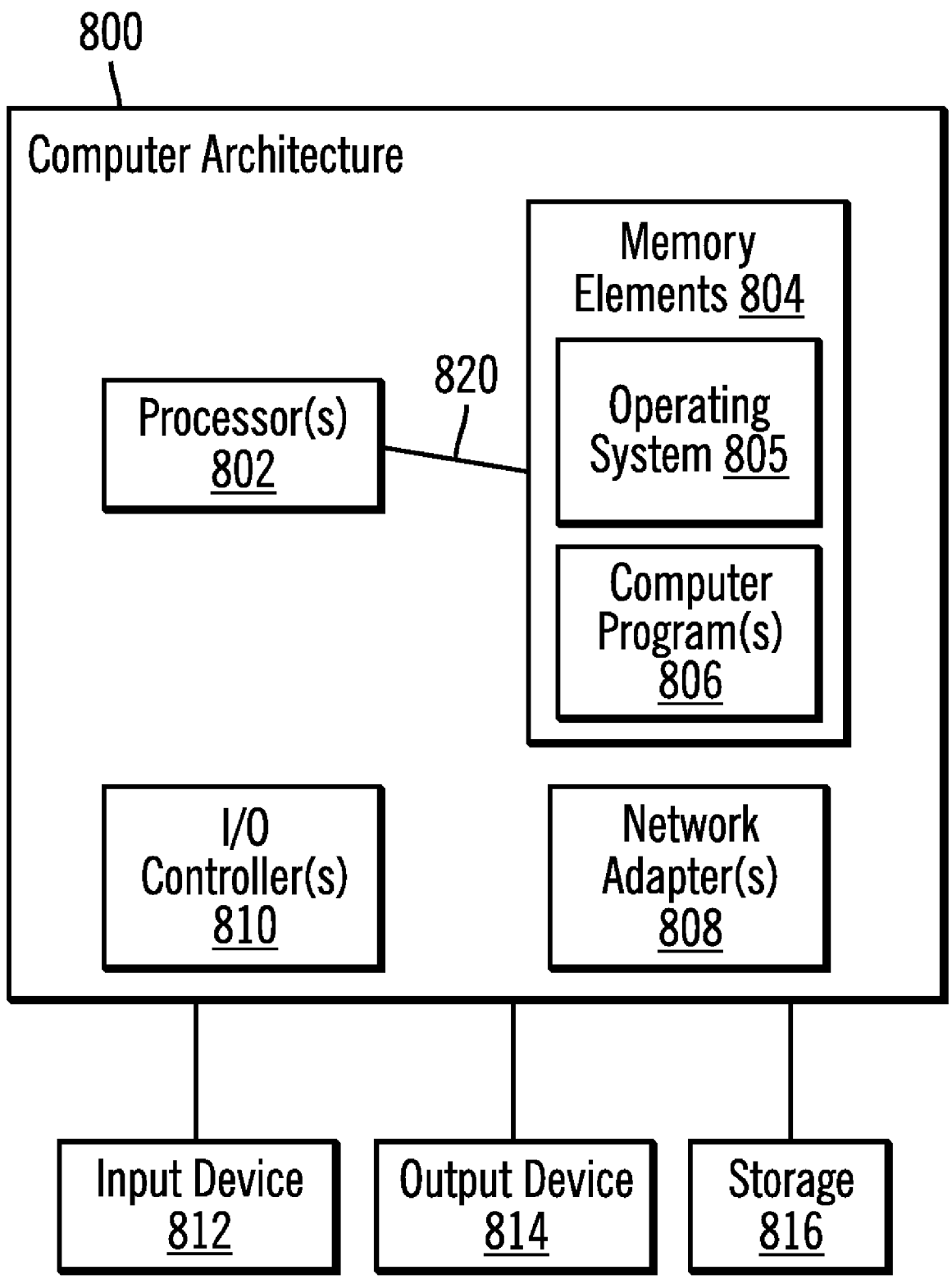
FIG. 8 illustrates a system architecture that may be used in accordance with certain embodiments.

FIG. 8 illustrates a system architecture 800 that may be used in accordance with certain embodiments. Computing device 100 may implement system architecture 800. The system architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system 805 and one or more computer programs 806.

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The system architecture 800 may be coupled to storage 816 (e.g., a non-volatile storage area, such as magnetic disk drives, optical disk drives, a tape drive, etc.). The storage 816 may comprise an internal storage device or an attached or network accessible storage. Computer programs 806 in storage 816 may be loaded into the memory elements 804 and executed by a processor 802 in a manner known in the art.

The system architecture 800 may include fewer components than illustrated, additional components not illustrated herein, or some combination of the components illustrated and additional components. The system architecture 800 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method, comprising:
setting a number of allowed dequeue operations allowed by an operator in a data flow diagram in a current step of processing for a data structure, wherein the number of allowed dequeue operations limit at least one of an amount of CPU resources and an amount of memory resources to be used by the operator;
activating the operator by passing control to the operator;

in response to receiving control back from the operator, examining the data structure size to determine whether the operator enqueued or dequeued at least one data item; and in response to determining that the operator did not enqueue or dequeue at least one data item, raising an error.

2. The method of claim 1, wherein multiple operators are selected sequentially using a single thread of control using a single stack.

3. The method of claim 1, wherein the operator is capable of producing and consuming one or more data items based on the at least one of the amount of CPU resources and the amount of memory resources proportional to the number of allowed dequeue operations.

4. The method of claim 1, further comprising:
controlling granularity of a number of data items that the operator is allowed to consume within the limit of the at least one of the amount of the CPU resources and the amount of the memory resources to be used by the operator.

5. The method of claim 1, further comprising:
controlling granularity of a number of data items that the operator is allowed to produce within the limit of the at least one of the amount of the CPU resources and the amount of the memory resources to be used by the operator.

6. The method of claim 1, further comprising:
receiving a request from the operator for a new data item in the data structure; and
in response to determining that the data structure is not empty and that a number of successful dequeue operations done in the current step are greater than or equal to the number of allowed dequeue operations, returning an indication that the data structure is empty.

7. The method of claim 1, further comprising:
receiving a request from the operator for a new data item in the data structure; and
in response to determining that the data structure is not empty and that a number of successful dequeue operations done in the current step are less than the number of allowed dequeue operations, returning a data item from the data structure.

8. The method of claim 1, wherein determining whether the operator enqueued or dequeued at least one data item is used to ensure forward progress by the operator.

9. A computer program product comprising computer-readable storage device storing a computer readable program, wherein the computer readable program when executed on a computer causes the computer to:
set a number of allowed dequeue operations allowed by an operator in a data flow diagram in a particular step of processing for a data structure, wherein the number of allowed dequeue operations limit at least one of an amount of CPU resources and an amount of memory resources to be used by the operator;
activate the operator by passing control to the operator;
in response to receiving control back from the operator, examine the data structure size to determine whether the operator enqueued or dequeued at least one data item; and
in response to determining that the operator did not enqueue or dequeue at least one data item, raising an error.

10. The computer program product of claim 9, wherein multiple operators are selected sequentially using a single thread of control using a single stack.

11. The computer program product of claim 9, wherein the operator is capable of producing and consuming one or more data items based on the at least one of the amount of CPU resources and the amount of memory resources proportional to the number of allowed dequeue operations.

12. The computer program product of claim 9, wherein the computer readable program when executed on a computer causes the computer to:
control granularity of a number of data items that the operator is allowed to consume within the limit of the at least one of the amount of the CPU resources and the amount of the memory resources to be used by the operator.

13. The computer program product of claim 9, wherein the computer readable program when executed on a computer causes the computer to:
control granularity of a number of data items that the operator is allowed to produce within the limit of the at least one of the amount of the CPU resources and the amount of the memory resources to be used by the operator.

14. The computer program product of claim 9, wherein the computer readable program when executed on a computer causes the computer to:
receive a request from the operator for a new data item in the data structure; and
in response to determining that the data structure is not empty and that a number of successful dequeue operations done in the current step are greater than or equal to the number of allowed dequeue operations, return an indication that the data structure is empty.

15. The computer program product of claim 9, wherein the computer readable program when executed on a computer causes the computer to:
receive a request from the operator for a new data item in the data structure; and
in response to determining that the data structure is not empty and that a number of successful dequeue operations done in the current step are less than the number of allowed dequeue operations, return a data item from the data structure.

16. The computer program product of claim 9, wherein determining whether the operator enqueued or dequeued the at least one data item is used to ensure forward progress by the operator.

17. A system for processing a query including semi-joins, comprising:
a processor;
storage coupled to the processor;
wherein the storage has stored thereon a program;
wherein the processor executes the program to perform operations, and wherein the operations comprise:
setting a number of allowed dequeue operations allowed by an operator in a data flow diagram in a particular step of processing for a data structure, wherein the number of allowed dequeue operations limit at least one of an amount of CPU resources and an amount of memory resources to be used by the operator;
activating the operator by passing control to the operator;
in response to receiving control back from the operator, examining the data structure size to determine whether the operator enqueued or dequeued at least one data item; and
in response to determining that the operator did not enqueue or dequeue at least one data item, raising an error.

18. The system of claim 17, wherein multiple operators are selected sequentially using a single thread of control using a single stack.

19. The system of claim 17, wherein the operator is capable of producing and consuming one or more data items based on the at least one of the amount of CPU resources and the amount of memory resources proportional to the number of allowed dequeue operations.

20. The system of claim 17, wherein the operations further comprise:
controlling granularity of a number of data items that the operator is allowed to consume within the limit of the at least one of the amount of the CPU resources and the amount of the memory resources to be used by the operator.

21. The system of claim 17, wherein the operations further comprise:
controlling granularity of a number of data items that the operator is allowed to produce within the limit of the at least one of the amount of the CPU resources and the amount of the memory resources to be used by the operator.

22. The system of claim 17, wherein the operations further comprise:
receiving a request from the operator for a new data item in the data structure; and
in response to determining that the data structure is not empty and that a number of successful dequeue operations done in the current step are greater than or equal to the number of allowed dequeue operations, returning an indication that the data structure is empty.

23. The system of claim 17, wherein the operations further comprise:
receiving a request from the operator for a new data item in the data structure; and
in response to determining that the data structure is not empty and that a number of successful dequeue operations done in the current step are less than the number of allowed dequeue operations, returning a data item from the data structure.

24. The system of claim 17, wherein determining whether the operator enqueued or dequeued the at least one data item is used to ensure forward progress by the operator.

* * * * *